United States Patent [19]

Moureaux et al.

[11] Patent Number: 5,180,701
[45] Date of Patent: Jan. 19, 1993

[54] PROCESS FOR EXTRUDING CRYSTALLINE ALUMINOSILICATES

[75] Inventors: Patrick Moureaux; Jean P. Darnanville, both of Grand Couronne, France

[73] Assignee: Shell Oil Company, Houston, Tex.

[21] Appl. No.: 807,351

[22] Filed: Dec. 16, 1991

[30] Foreign Application Priority Data

Dec. 21, 1990 [FR] France .................................. 90 16140

[51] Int. Cl.$^5$ .......................... B01J 29/04; B01J 37/00
[52] U.S. Cl. ........................................ 502/64; 502/62; 502/87
[58] Field of Search ............... 502/62, 86, 87, 64, 502/79

[56] References Cited

U.S. PATENT DOCUMENTS 3,836,561  9/1974  Young .................................. 502/62
4,594,332  6/1986  Hoelderich et al. .................. 502/62

FOREIGN PATENT DOCUMENTS 167324   6/1986  European Pat. Off. .
313163  10/1988  European Pat. Off. .

Primary Examiner—Carl F. Dees

[57] ABSTRACT

The present invention relates to a process for preparing a shapable dough which comprises mixing and kneading a silica source, a dealuminated aluminosilicate zeolite source, water and a trialkanolamine containing at least two carbon atoms per alkanolamine moiety, to a shapable dough thus obtained, and to the preparation of extrudates containing dealuminated aluminosilicate zeolites by extruding a shapable dough comprising a silica source, a dealuminated aluminosilicate zeolite source, water and a trialkanolamine and having a total solids content between about 25% by weight and about 75% by weight and a trialkanolamine content between about 0.5% by weight and about 40% by weight, basis on the total solid content of the mixture.

14 Claims, No Drawings

PROCESS FOR EXTRUDING CRYSTALLINE ALUMINOSILICATES

FIELD OF THE INVENTION

The present invention relates to the preparation of a shapable dough comprising a silica source and a crystalline aluminosilicate source, to a process for preparing crystalline aluminosilicate extrudates, to extrudates containing crystalline aluminosilicates, to the preparation of calcined extrudates containing crystalline aluminosilicates and to the use of such extrudates as catalyst carriers or as catalysts.

BACKGROUND OF THE INVENTION

It is well-known in the art that aluminosilicate zeolites can be composited with a matrix or a binder material in order to impart strength thereto. Alumina is a well-known and cheap binder material and is often used in commercially developed zeolite systems. It appears, as acknowledged in EP-A-0167324, that it is much more difficult to use silica as binder for aluminosilicate zeolites if one is to take advantage of the inherent properties of silica as a catalyst (co)carrier beyond the techniques of filling or pelletising.

In said EP-A-0167324, it is described that both silica and mixtures of silica and aluminosilicate zeoliters can be extruded when using an alkali metal compound such as sodium hydroxide or sodium carbonate in a total solids content of from 25% to 75% by weight, the alkali compound being added in an amount of from 0.25 to 10% by weight on a dry basis, based on total solids content of the mixture. The crush strength of materials thus extruded appears to have increased substantially.

The choice of an alkali compound as extrusion aid is rather specific in that it is stated emphatically in the above European patent specification that ammonium hydroxide is not effective but that more basic quaternary ammonium hydroxides can be used although they are not preferred because of a tendency to produce thixotropic masses which are difficult to extrude as well as the fact that they are relatively expensive.

It appears, however, that the use of an alkali compound as an extrusion aid for aluminosilicate zeolite containing systems has a severe drawback in that it substantially damages the crystallinity of crystalline aluminosilicate zeolites having a relatively high silica-alumina molar ratio. This holds both for crystalline aluminosilicate zeolites prepared as such or which have been subjected to one or more dealumination procedures known to those skilled in the art.

It has now been found that a certain class of alkanolamines can be suitable applied to produce extrudates containing silica and dealuminated aluminosilicate zeolites wherein the aluminosilicate zeolites have retained no less than 90% of their initial crystallinity which renders such extrudates particularly attractive for the production of various types of, inter alia, hydroprocessing catalysts.

SUMMARY OF THE INVENTION

The present invention therefore relates to a process for preparing a shapable dough which comprises mixing and kneading a silica source, a dealuminated aluminosilicate zeolite source, water and a trialkanolamine containing at least two carbon atoms per alkanolamine moiety.

The invention further relates to a process for the preparation of extrudates containing silica and a dealuminated aluminosilicate zeolite which comprises mixing and kneading a silica source, a dealuminated aluminosilicate zeolite source as defined hereinafter, water and a trialkanolamine containing at least two carbon atoms per alkanolamine moiety and extruding the mixture. The extrudates thus produced have retained at least 90% of their initial crystallinity and moreover, the extrusion process can be carried out very smoothly.

The invention further relates to a process for preparing calcined extrudates containing silica and a dealuminated aluminosilicate zeolite which comprises extruding a shapable dough into extrudates containing silica and a dealuminated aluminosilicate zeolite and calcining the extrudates obtained to a final temperature of between about 300° C. and about 1000° C., and to calcined extrudates thus obtained.

DESCRIPTION OF THE PREFERRED EMBODIMENTS

The trialkanolamines used in the preparation of the shapable dough and the extrudates formed therefrom have at least two carbon atoms in the respective alkanolamine moieties. Preference is given to the use of trialkanolamines containing up to five carbon atoms in the respective alkanolamine moieties. It is advantageous to use trialkanolamines having the same number of carbon atoms in alkanolamine moiety; in particular the use of triethanolamine is preferred.

It has been found that the use of monoethanolamine, which is the preferred extrusion aid for the preparation of silica-alumina extrudates as described in EP-A-313163, is not suitable in the extrusion of shapable doughs comprising such compound together with silica and a dealuminated aluminosilicate zeolite since nearly half of the initial crystallinity of the dealuminated aluminosilicate zeolite is destroyed.

The trialkanolamines to be used in the process according to the present invention are suitably present in the shapable dough in an amount of from about 0.5% by weight to about 20% by weight calculated on the total solids content of the mixture. Preferably, the trialkanolamines are present in amounts between about 1% by weight and about 15% by weight, in particular between about 1% by weight and about 10% by weight, calculated on the total solids content of the mixture. It should be noted that compounds capable of releasing a trialkanolamine (as defined hereinbefore) during the preparation of the dough and/or the subsequent extrusion are also contemplated within the scope of the present invention.

The total solids content of the mixture comprising a silica source, a dealuminated aluminosilicate zeolite, water and a trialkanolamine as defined hereinbefore is suitably between about 25% by weight and about 75% by weight, preferably between about 25% by weight and about 60% by weight, more preferably between about 30% by weight and about 45% by weight, in order to obtain a smoothly extrudable mixture.

Dealuminated aluminosilicate zeolites which will be transferred into extrudates using the process according to the present invention are defined for the purpose of this invention as aluminosilicate zeolites having an average pore diameter of at least about 7 Å and a silica-alumina molar ratio of at least about 18.5. Preferably, the dealuminated aluminosilicate zeolites have an average pore diameter of at least about 8 Å and a silica-alumina molar ratio of at least about 20. Dealuminated forms of zeolite Y are of particular interest since they fine application in many (hydro)conversion process.

As already referred to hereinabove, aluminosilicates which have been prepared with higher than normal silica-alumina ratios can also be suitably applied in the process according to the present invention. Examples of dealumination techniques comprise inter alia the use of acid extraction, the use of silicon halides or other suitable chemical treating agents, chelates as well as the use of chlorine or chlorine-containing gases at high temperatures. Good results have been obtained using materials which have been subjected to one or more acid-leaching procedures, but other techniques can be applied as well.

The source of silica used in the preparation of extrudates in accordance with the present invention is not critical and any suitable source of silica can be used. Examples of suitable, commercially available silicas comprise Ludox AS40 (Du Pont) and Hi-Sil 233 (PPG Industries).

To improve the flux properties in the extruder, the mixture may also comprise a polyelectrolyte, such as Nalco 7879 (obtainable from Nalco). The mixture (with or without polyelectrolyte) can readily be extruded e.g. over the metal die-plate of a Bonnot-extruder. Cylindrical extrudates can suitably be prepared, but other shapes can be prepared as well, such as trilobes and quadralobes. Reference is made in this respect to U.S. Pat. No. 4,028,2227.

It is possible to admix prior to extrusion small amounts of one or more inorganic oxides to the composition to be extruded. The incorporation of such inorganic oxides is particularly useful when such oxides impart (additional) catalytic activity to the system containing such oxides.

The extrudates according to the present invention can be suitably applied as catalyst carriers or as catalysts. When applied as catalysts, the catalytic activity is primarily secured by the presence of one or more metals and/or metal compounds from Group VI and/or Group VIII of the Periodic Table of the Elements. The choice of the metal(s) and/or metal compounds depends primarily on the envisage duty of the catalysts and are known to those skilled in the art.

Suitably, the extrudates according to the present invention can be used as catalysts or catalyst carriers in (hydro) conversion processes such as hydrogenation, dehydrogenation, hydrocracking, isomerization, polymerization, reforming and catalytic cracking, and in particular, in hydrogenation or hydrocracking processes.

When the extrudates according to the present invention are to be used in hydrogenation processes, they suitably contain at least one metal or metal compound of Group VIII, suitably nickel, cobalt, ruthenium, rhodium, palladium, osmium, iridium and platinum. Particularly preferred are platinum and palladium, preferably when used together. The amount of Group VIII metal(s) or metal compounds suitably ranges between about 0.05% by weight and about 10% by weight, calculated as metal on dealuminated aluminosilicate zeolite and silica. Preferred amounts are between about 0.2% by weight and about 5% by weight, calculated as metal on dealuminated aluminosilicate zeolite and silica. When two noble metals are applied, the amount of the two metals normally ranges between about 0.5% by weight and about 3% by weight, calculated as metal on dealuminated aluminosilicate zeolite and silica. When platinum and palladium are used as the noble metals normally a platinum/palladium molar ratio of about 0.25 to about 0.75 is applied.

When the extrudates according to the present invention are to be used in hydrocracking duty, they suitably contain at least one metal or metal compound from Group VI of the Periodic Table of the Elements and/or at least one metal or metal compound of Group VIII of the Periodic Table of the Elements. Preference is given to the use of molybdenum and tungsten as Group VI metals and of nickel and cobalt as Group VIII metals. Preferred metal combinations comprise nickel and molybdenum and/or tungsten as well as cobalt and molybdenum and/or tungsten. The amount of Group VI and/or Group VIII metal(s) suitably ranges between about 1% by weight and about 25% by weight, calculated as metal on dealuminated aluminosilicate zeolite and silica. Preferred amounts are between about 1% by weight and about 15% by weight for Group VI metals and between about 5% by weight and about 25% by weight of Group VIII metals, calculated as metal on dealuminated aluminosilicate zeolite and silica.

The metal(s) (compound)(s) to be present in the catalysts based on extrudates produced in accordance with the present invention can be suitably incorporated into the extrudates by methods known in the art such as impregnation or ion-exchange techniques. Both wet and dry impregnation techniques can be suitably applied. Normally, the loaded extrudates will be subjected to a drying treatment to remove solvent still present. Suitable drying temperatures range from ambient temperature to about 200° C., preferably between about 50° C. and about 125° C. If desired, the loaded extrudates may be subjected to a calcining treatment which is suitably carried out at a temperature range between about 300° C. and about 1000° C., preferably between about 400° C. and about 850° C.

The reaction conditions of the various (hydro)conversion processes are known to those skilled in the art. When the loaded extrudates are to be used in hydrogenation processes such processes are suitably carried out at a temperature between about 150° C. and about 450° C., in particular between about 250° C. and about 400° C., and preferably between about 225° C. and about 300° C. and at a pressure between about 20 bar and about 150 bar, in particular between about 30 bar and about 100 bar, preferably between about 40 bar and about 90 bar. Space velocities between about 0.05 kg/l/h and about 10 kg/l/h can be suitably applied, preference being given to space velocities between about 0.1 kg/l/h and about 5 kg/l/h. Hydrogen/feedstock ratios (Nl/kg) between about 200 and about 2000 can be suitably applied, preferably between about 400 and about 1500.

Typically, a hydrogenation process using a catalyst based on an extrudate according to the present invention will be carried out under conditions which allow substantial hydrogenation of the feedstock, say at least about 70% of the total amount of components capable of being hydrogenated. It is preferred to carry out the hydrogenation process under conditions which allow at least about 80% conversion by hydrogenation of the hydrogenatable components, with amounts above about 90% being particularly preferred. By a proper choice of temperature and pressure, more than about 95% of the hydrogenatable components can be hydrogenated.

The extrudates according to the present invention can be suitably used to hydrogenate kerosene and/or cycle oils. Kerosenses which can be advantageously applied comprise straight run kerosenes having a boiling range between 130° C. and 275° C. as well as hydrotreated kerosenes. Also so-called cycle oils, normally obtained from catalytic cracking operations can be suitably applied as feedstocks. Light cycle oils, medium cycle oils as well as heavy cycle oils can be processed advantageously. It is also possible to hydrogenate process streams obtainable from hydrocracking operations. Both distillate fractions and bottom streams can be suitably hydrogenated.

Depending on the sulfur and nitrogen levels of the feedstock(s) and the (hydro)conversion process contemplated, it may be advantageous to subject the feedstocks to one or more pre-treatments to reduce the levels of sulfur and nitrogen accordingly. In the case of hydrogenation being the process envisage, it has been found that feedstocks containing up to 1000 parts per million by weight of sulfur and up to 200 parts per million by weight of nitrogen can be processed adequately. The pre-treatment which can be applied is suitably a conventional hydrotreatment. Such treatments are normally carried out at a temperature between 200° C. and 375° C. and at a pressure between 40 and 100 bar using a catalyst containing Group VI and/or Group VIII metal compounds on an amorphous carrier such as alumina, silica or silica-alumina.

As hydrogen source, use can be made of pure hydrogen or of hydrogen-containing mixtures, for instance the gases produced in catalytic reforming processes.

The invention will now be illustrated by means of the following Examples which are illustrative and are not to be construed as limiting the scope of the present invention and claims.

EXAMPLE I

A mixture was prepared having the following composition:

| | |
|---|---|
| dealuminated zeolite Y (silica-alumina ratio = 35.9) | 75 g |
| silica (Ludox AS40) | 104.7 g |
| triethanolamine | 10 g |
| flocculating agent (Nalco) | 2 g |

The mixture was prepared by mixing the dealuminated zeolite Y with the mixture of Ludox and triethanolamine which had been kneaded for 40 minutes using a peristaltic pump. The flocculating agent was then added to the mixture which was then kneaded for another 15 minutes. The total kneaded mixture was extruded without any difficulty. The extrudates obtained (1.6 mm) were dried at 115° C. for a period of 3 hours and then calcined at 500° C. for a period of 2 hours.

It was found that mass loss did not occur and that the crystallinity of the dealuminated zeolite Y present in the extrudates amounted to 97% of the crystallinity of the dealuminated zeolite Y prior to extrusion according to the present invention.

COMPARATIVE EXAMPLE A

The process as described in Example I was repeated but using monoethanolamine as extrusion agent. Although again no mass loss was observed, it appeared that the crystallinity of the dealuminated zeolite present in the extrudates amounted to only 57% of the crystallinity of the dealuminated zeolite Y prior to extrusion.

COMPARATIVE EXAMPLE B

The process as described in the previous Example was repeated but using tetrabutyl ammonium hydroxide as extrusion agent. A mass loss of no less than 50% by weight was observed and the crystallinity of the dealuminated zeolite present in the extrudates amounted to only 28% of the crystallinity of the dealuminated zeolite prior to extrusion.

EXAMPLE II

Extrudates containing 60% by weight of a dealuminated zeolite Y (silica-alumina ration 35.9) and 40% by weight of silica were prepared by kneading the appropriate amounts of dealuminated zeolite Y and Ludox AS40 in the presence of Nalco 7879 (1% by weight) and extruding the resulting paste in a Haake Rheocard extruder. The extrudates were dried at 115° C. for a period of 3 hours and subjected to calcination at 800° C. for 2 hours.

The extrudates thus obtained were impregnated with a solution of $H_2PtCl_6$ (to provide 0.3% by weight of Pt) and of $H_2PdCl_4$ (to provide 0.5% by weight of Pd) using the incipient wetness technique. The impregnated catalysts were calcined at a temperature of 300° C. for a period of 2 hours. The bulk crushing strength of the ready catalyst was 1.40 M Pa which is more than sufficient from a performance point of view.

The catalysts were tested in the hydrogenation of a hydrotreated cycle oil containing 273 mmoles monoaromatics/100 grams feed and containing also 112 parts per million of sulfur and 76 parts per million of nitrogen. Prior to use the catalyst had been reduced at a temperature of 400° C. for a period of 16 hours.

The hydrogenation was carried out using full extrudates diluted with silicon carbide particles (1:4) at a hydrogen partial pressure of 48.9 bar and at a weighted hourly space velocity of 2 kg/1 liter catalyst/h. After 93 hours of operation at a temperature of 288° C. followed by 24 hours at 299° C. the monoaromatics level amounted to 31.7 millimoles monoaromatics/100 grams feed which constitutes a reduction of 88.5%. The sulfur level had been reduced to 14 parts per million by weight.

What is claimed is:

1. A process for preparing a shapable dough which comprises mixing and kneading a silica source, a dealuminated aluminosilicate source, water and a trialkanolamine containing at least two carbon atoms per alkanolamine moiety, thus forming a mixture.

2. The process according to claim 1 wherein said mixture has a total solids content of from about 25% by weight to about 75% by weight, and the trialkanolamine is present in an amount of from about 0.5% by weight to about 40% by weight on the total solids content of the mixture.

3. The process according to claim 2 wherein a mixture is used having a total solids content of from about 25% by weight to about 60% by weight, and the trialkanolamine is present in an amount between about 1% by weight and about 35% by weight basis the total solids content of the mixture.

4. The process according to claim 1 wherein a trialkanolamine having up to five carbon atoms in the respective alkanolamine moieties is used.

5. The process according to claim 4 wherein a trialkanolamine having the same number of carbon atoms in each alkanolamine moiety is used.

6. The process according to claim 1 wherein said shapable dough additionally comprises a polyelectrolyte flocculating agent.

7. The process according to claim 1 a dealuminated aluminosilicate zeolite having an average pore diameter of at least about 7 Å and a silica-alumina molar ratio of at least about 18.5 is used.

8. The process according to claim 7 wherein a dealuminated zeolite Y is used.

9. A process for preparing crystalline aluminosilicate extrudates from a shapable dough which comprises mixing and kneading a silica source, a dealuminated aluminosilicate zeolite source, water and a trialkanolamine containing at least two carbon atoms per alkanolamine group to obtain a mixture having a total solids content of from about 25% by weight to about 75% by weight, wherein the trialkanolamine is present in an amount of from about 0.5% by weight to about 40% by weight, basis the total solids content of the mixture, and subsequently extruding the mixture.

10. The process according to claim 9 wherein a shapable dough containing from about 25% by weight to about 60% by weight of total solids, and between about 1% by weight and about 35% by weight on total solids content of the mixture of a trialkanolamine is used.

11. The process according to claim 9 wherein a dealuminated aluminosilicate zeolite having an average pore diameter of at least about 7 Å and a silica-alumina molar ratio of at least about 18.5 is used.

12. The process according to claim 11 wherein a dealuminated aluminosilicate zeolite having an average pore diameter of at least about 8 Å and a silica-alumina molar ratio of at least about 20 is used.

13. The process according to claim 9 wherein the extrudates obtained are dried at a temperature in the range between about 80° C. and about 125° C., for a period between about 1 and about 24 hours.

14. The process according to claim 13 wherein the extrudates obtained are subjected to a calcining treatment at a temperature between about 300° C. and about 1000° C.

* * * * *